United States Patent [19]

Hanson et al.

[11] Patent Number: 4,579,741
[45] Date of Patent: Apr. 1, 1986

[54] FABRICATED SEAFOOD

[75] Inventors: Marc C. Hanson, St. Louis Park; Bennie L. Legaux, Minneapolis; Thomas A. Renshaw, St. Paul; Sidney F. Sapakie, Plymouth, all of Minn.

[73] Assignee: General Mills, Inc., Minneapolis, Minn.

[21] Appl. No.: 633,548

[22] Filed: Jul. 23, 1984

[51] Int. Cl.<sup>4</sup> .................. A23L 1/325; A23P 1/12
[52] U.S. Cl. .................... 426/92; 426/104; 426/643; 426/574; 426/513; 426/516; 426/802
[58] Field of Search ............ 426/104, 89, 643, 513, 426/517, 802, 574, 516, 92

[56] References Cited

U.S. PATENT DOCUMENTS

| | | | |
|---|---|---|---|
| 3,493,391 | 2/1970 | Pottie | 426/643 |
| 3,863,017 | 1/1975 | Yueh | 426/643 |
| 4,216,240 | 8/1980 | Shirai et al. | 426/802 X |
| 4,303,688 | 12/1981 | Shimura et al. | 426/643 X |
| 4,309,450 | 1/1982 | Seibert | 426/302 X |
| 4,362,752 | 12/1982 | Sugino et al. | 426/643 X |
| 4,396,634 | 8/1983 | Shenouda et al. | 426/802 X |

Primary Examiner—Robert Yoncoskie
Attorney, Agent, or Firm—Gene O. Enockson; John A. O'Toole

[57] ABSTRACT

Disclosed are fabricated seafoods, such as analogue shrimp meats, and their methods of preparation. A fish paste is provided comprising about 60% to 95% surimi, 0% to 5% starch, 0% to 25% water and 0% to 4% vegetable or marine oil. The paste is blended without aeration and kept at less than 10° C. The paste is extruded as a rope to a first heating zone to heat set the exterior to form a skin. The rope is then fed to an in-line static mixture, preferably free floating, to texturize the still soft rope core. The textured rope is then heated again to firm the texturized core. The rope is then shaped into pieces of predetermined size and shape and then coagulated by heat application thereto. The fabricated seafoods so prepared are characterized by the "bite," an aligned or braided fibrous interior, and the skin of real shrimp.

22 Claims, No Drawings

FABRICATED SEAFOOD

BACKGROUND OF THE INVENTION

1. Technical Field

The present invention relates to food products and to their methods of preparation. More particularly, the present invention relates to fabricated seafoods such as shrimp analogue meats and to their methods of preparation.

2. The Prior Art

The prior art includes many attempts at fabricating a variety of analogue meats from various protein sources. The problems faced are particular to the protein source employed due to differences in both physical structure and functional properties of the various protein sources. Thus, techniques useful for employing particular vegetable proteins may differ from fish sources, for example. Moreover, even within certain classes, e.g., vegetable proteins, techniques for using one, e.g., soy protein, may differ from another, e.g., wheat gluten. Moreover, useful techniques are also dependent upon the particular product which is being prepared, e.g., bacon vs. meat tidbits.

The present invention is directed to providing fabricated seafoods from fish protein materials. Ideally, the product prepared is low in cost yet provides textural characteristics as close to the real product as possible. Specifically, fabricated seafood products should exhibit the characteristic "bite" of the shellfish simulated. Additionally, the structure of the fabricated product should resemble the fibrous structure of shrimp muscle. Moreover, real shrimp are additionally characterized by a complex structure which is both aligned and fibrous. Also, real shrimp have a skin feature.

The prior art includes many attempts at fabricating low cost seafoods analogous to expensive shellfish such as crab or shrimp. Indeed, shrimp analogue meats are popular food items. Generally, such food items employ small shrimp or shrimp pieces, occasionally extended with other fish flesh, which are formed into larger size pieces by molding. (See, for example, U.S. Pat. No. 3,852,505, issued Dec. 3, 1974 to Leon Rubin, U.S. Pat. No. 3,712,821, issued Jan. 23, 1973 to Ronswalli et al., and U.S. Pat. No. 3,615,686, issued Oct. 26, 1971 to Marshall). While these processes do form large formed shrimp with the "bite" of real shrimp in varying degrees, the formed shrimp do not have the fibrous internal structure of real shrimp. Moreover, such products have not found acceptance outside of breaded product application due to their appearance and texture deficiencies.

However, attempts have also been made to add a fibrous structure to formed shrimp products lacking in the above described products. In U.S. Pat. No. 3,863,017 (issued Jan. 28, 1975 to Mao Yueh) dried cod fibers were added to a fish paste from which the formed shrimp was heat set. U.S. Pat. No. 3,852,484 (issued Dec. 3, 1974 to J. M. Cabot) discloses a similar technique but substitutes soy fibers as the texture enhancer. (See also U.S. Pat. No. 4,423,083, issued Dec. 27, 1983 to S. Shenouda wherein fabricated protein fiber bundles using alginate gels as texture enhancers are disclosed). While these methods further improve the perceived texture of formed shrimp, the fibers are, however, randomly aligned unlike the more structured appearance of shrimp or crab.

Additionally, the art includes a number of imitation crab products that have been produced using a process similar to that described in U.S. Pat. No. 4,158,065, (issued June 12, 1979 to Sugino). In this process, a fish paste is extruded in a thin sheet and heat set. The sheet is then cut into strips which are bundled together to form a product with the linear fiber characteristics of crab. Although these products do have the internal structure of crab, the linear alignment of the fiber does not resemble the fiber structure found in shrimp.

Another fabricated seafood having a good texture is prepared and marketed by Taiyo Fisheries Co. The product is believed to comprise, generally, gelled, chopped surimi matrixed in an unstructured surimi base. However, in addition to being a complex and labor intensive product, the cross sectional appearance of the Taiyo fabricated shrimp is unrealistic in that the fibers are not linearly aligned.

It has now been surprisingly discovered that further improvements in the "bite" of fabricated seafoods can be provided by fabricating the products with a skin feature. The superior texture properties provided by the present invention reside in part in the discovery that the skin and the interior braided bundle each give different bite resistance. The eating sensation is therefore even closer to real shrimp or shellfish which are characterized by varying resistance as the piece is bitten. Moreover, it has been surprisingly discovered that further improvements can be made in the structure of fabricated seafoods additionally improving the texture of such products.

Accordingly, it is an object of the present invention to provide fabricated shrimp having the texture and bite of real shrimp.

Another object of the present invention is to provide seafoods which are prepared from marine protein sources.

It is a further object of the present invention to provide fabricated shrimp having a fibrous texture.

It is a further object of the present invention to provide fabricated shrimp wherein the fiber is structured or aligned analogous to real shrimp.

Still another object of the present invention is to provide formed seafoods having a skin portion which is dissimilar to the structured fibrous meaty interior.

Still another object is to provide processes for the provision of such products which are simple, limited in necessary steps, continuous or at least semi-continuous and not labor intensive.

It is surprisingly discovered that the above objectives can be realized and superior fabricated seafood meat analogues can be prepared. The analogue products are prepared by providing a particularly defined fish paste rope, forming a skin, texturizing the core of the rope in prescribed manner, firming the rope with heat, shaping the rope into pieces of predetermined size and shape, and then setting the pieces by application of heat.

SUMMARY OF THE INVENTION

The present invention relates to fabricated seafoods such as analogue shrimp meats and crab leg sticks as well as their methods of preparation. The fabricated seafoods are characterized by the characteristic "bite" of real shellfish seafoods. The texture advantages result in part from the aligned fibrous interior of the seafood pieces. The pieces are also characterized by an untexturized skin which further aids in simulating the texture of real shellfish. In its method aspect, the present invention resides in part in providing simplified methods for preparing fabricated seafoods having a skin feature.

In one embodiment of preparation herein, a fish paste is first provided comprising 60% to 100% surimi, 0% to 20% water, 0% to 5% starch and 0% to 4% oil. The paste is formed by non-aerating blending at less than 10° C.

Thereafter, the fish paste is extruded into a rope and a skin is formed by heating the exterior to above 165° F. to heat set the exterior of the rope to a depth of 2 to 7 mm. to form a skin.

The rope is next core texturized such as by using an in-line mixer to braid the still soft core. Thereafter, the rope is firmed with heat, and then shaped into pieces of predetermined size and shape. The pieces are further set with heat.

DETAILED DESCRIPTION OF THE INVENTION

The present invention relates to fabricated shellfish seafood products such as shrimp or crab analogue meats as well as to their methods of preparation. The present fabricated seafoods are prepared from a fish paste rope, forming a skin, texturizing the core of the rope, firming with heat, and then shaping and heat setting. Each of the seafood preparation steps as well as product use are further described in detail below.

Throughout the specification and claims, percentages are by weight and temperatures in degrees Fahrenheit unless otherwise indicated.

A. Providing a Fish Paste

An initial essential step of the present method of preparation of fabricated seafood products is the provision of a fish paste which can provide products having the texture strength of shellfish. The fish paste essentially comprises surimi, starch, water and oil and may also include additional optional ingredients.

The present fish pastes essentially comprise from about 60% to 100%, preferably 80% to 95% of surimi. Best results in terms of end product organoleptic properties are obtained with about 90% surimi. Surimi is a well known Japanese fish paste product staple. It consists of washed, minced fish flesh, and occasionally, incidental amounts of sugars, sorbital, and phosphate salt. Optionally, a protein anti-denaturant can also be added. If present, the sorbitol content of surimi typically is about 0.1% to 4%. The sorbital and sugars are typically added to reduce freezer burn when frozen storage is contemplated. The polyphosphate content, e.g., sodium tripolyphosphate, of surimi can be about 0.05% to 0.3% which is used as a protein extraction aid in surimi preparation. While not useful to the present invention, it is not essential to remove such material if present at only conventional levels. The water content of surimi is typically about 73%.

Due to cost considerations, surimi is typically prepared from inexpensive fish flesh sources although any edible fin or shellfish flesh can be used. Traditionally, the fish employed is Gulf Croaker (*Micropogan undulatus*), although Alaskan Pollock (*Theragra chalcogrammus*) is also occasionally employed in whole or in part in substitution for Croaker.

In surimi preparation, the fish is gutted and then crushed or squeezed so that the mashed fish flesh is separated from skin, heat and bones. The separated mass is then water rinsed to remove water-soluble proteins. The drained fish meat thus obtained, with the other ingredients, is "surimi."

Optionally, the fish paste may include modest amounts, e.g., 1% to 75%, preferably about 5% to 20%, and most preferably 10%, of the fish flesh characteristics of the analogue to be prepared in substitution for the surimi, e.g., shrimp, crab, scallops, and the like. Thus, for example, when fabricated shrimp are to be prepared, the fish paste may contain 10% shrimp meat to aid in the provision of shrimp organoleptic properties. If shrimp meat is used, the uncooked deveined shrimp is first treated to deactivate enzymes. While any conventional enzyme inactivation is useful herein, the preferred technique is to add the shrimp while still frozen to a greatly excessive water bath maintained at 80° C. and held for about two minutes. Thereafter, the shrimp pieces are withdrawn and quickly cooled to room temperature or below, preferably below 10° C.

If desired, up to about 5% of the fish paste of such characterizing fish meat can be added in the form of coarse chopped pieces without seriously degrading the properties of the present fabricated seafood products. Thus, the fish can comprise about 0.1% to 5% of coarse chopped fish flesh. However, the fish paste can comprise about 0.1% up to about 10% if the non-surimi fish flesh is added in the form of a paste or as finely chopped pieces. For greater amounts of addition of shrimp meat and the like, i.e., greater than 10% up to about 70%, the shrimp flesh is preferably fabricated into fibers. Any of the known techniques for fiber formation can be used and the skilled artisan will have no problem selecting useful techniques. One preferred technique due to its simplicity is to form a shrimp meat paste with 2% sodium alginate, to sheet the paste into sheets, e.g., 2 to 5 mm. in thickness, to set the alginate by washing with a water bath containing a calcium ion as described herein, and to cut the sheet into fibers.

A starch component is a highly preferred ingredient in the fish paste and can comprise from about 0.1% to 5%, preferably 1% to 3%, and most preferably about 2.5% of the fish paste. As the fish protein is denatured in subsequent heating steps, moisture is given off. The starch binds the water both added and that given off. Insufficient starch amounts can undesirably lead to reduced product yields. However, excessive starch levels tend to increase the level of bound water which tends to adversely affect texture strength. The starch can be any conventional edible starch. Preferred for use herein are pregellatinized starches due to their superior water binding properties.

In addition to the water naturally associated with the surimi, the fish paste is preferably prepared with added water. If present, the added water can comprise about 0.1% to 25%, preferably 10% to 20%, of the paste and for best results about 10%.

The paste also preferably comprises an ingredient to provide a sensation of moistness or succulence. Suitable moistness agents for use herein include glycerol and/or oil. The paste desirably contains about 0.1% to 4% oil, preferably about 1% to 3%, and about 2% for best results. Due primarily to its flavor properties, if glycerol is used in lieu of oil, then the glycerol level(s) are about one-half of the oil levels. The oil(s) can be any oil, i.e., edible fatty triglyceride, which is liquid at room temperature, (i.e., a melting point of below approximately 70° F., or 20° C.), and can be derived from any conventional vegetable or marine source. Preferred for use herein are vegetable oils, e.g., soybean and cottonseed oil, due to their clean taste and cost. If marine oils are used, e.g., cod liver oils, then such materials should be deflavored and deodorized by conventional methods, e.g., steam distillation, solvent extraction, and the like. However, while it is desirable to maximize the moistness sensation provided by the present moistness ingredients, inclusion of such ingredients undesirably weakens texture strength. It has been surprisingly discovered that moistness perception per unit weight of oil or glycerol and water is maximized if both the water and oil(s) are added in solid form. Addition as solid oil (i.e., cooled to below melting point of a normally liquid oil) and as ice results in fabricated seafoods of uniformly dispersed minute pockets of water and oil which are too small to be visually noticed by the consumer but are large enough to give a sensation of juiciness which is, surprisingly, superior to that realized when the oil and water are homogeneously distributed.

One highly preferred optional component of the fish paste is a flavor whether natural or artificial. Such flavors are widely available from commercial flavor suppliers. Selection of suitable fish flavors, e.g., shrimp flavor or crab leg, of course, will depend upon the analogous product to which the present fabricated seafood products are intended to resemble. If present, the flavor is typically dispersed in water and comprises about 0.1% to 2% of the fish paste on a wet basis.

Another highly preferred fish paste ingredient is common salt. Salt also desirably acts to strengthen texture. Essential for use herein to obtain maximum performance per unit weight is to use a very fine granulation, e.g., fine flour salt, (70 to 200 microns, preferably less than 150 microns). Useful salt levels herein range from about 1% to 3% of the fish paste.

The paste may additionally contain one or more optional texture enhancing agents. For example, the paste can contain about 0.1% to 3%, preferably about 1% either carrageenan or alginates, e.g., sodium. The paste may also contain for added texture strength, from about 0.1% to 5%, preferably 2% of gelling proteins, e.g., soy, (Ralston Purina Co.'s Supro 620 TM soy protein).

The blend is desirably blended to form a uniform, homogeneous mixture of the essential fish paste ingredients. Desirably, such blending is practiced using conventional techniques which avoid aeration, such as employment of a conventional vertical cutter mixer or a cutter/mixer for sandwich meat or sausage preparation, manufactured by Hobart, inasmuch as it is not intended to create a foam. For equipment not specifically designed to provide a non-aerated product, it is convenient to pull a modest vacuum, e.g., 5 to 30 in. Hg., while performing the mixing operation to avoid aeration. Best textures are obtained when the mixing is performed at as close to but greater than 0° C. as possible, e.g., preferably 0° to 2° C. Temperatures exceeding 10° C. are to be avoided. To this end, the surimi can be added in a half frozen, half thawed state, and/or ice can be employed as the added water constituent. Moreover, extended mixing times are to be avoided due to adverse texture attributes due to gel formation initiation during mixing. Useful mixing times range from about 1 to 20 minutes, preferably about 8 to 12 minutes, and most preferably about 10 minutes.

Since gel formation begins during mixing, it is desirable to process the fish paste shortly after mix preparation.

B. Pre-gelling

In the most preferred embodiment, the de-aerated fish paste as prepared above is then formed into extrudates or ropes having soft cores having a gel-set shell or sheath. Thus, initially, the fish paste is subjected to a pre-gelling step to create the gel sheath. The pre-texturizing, gelling step can be practiced by feeding the fish paste to a conventional extruder, e.g., a ram extruder or screw type extruder, which feeds the extruded fish paste into one or more jacketed pipes or barrels in parallel. In one particular embodiment, the barrel can be from ⅜ inch to one inch in diameter (10 to 25 mm.), although ½ inch (12.5 mm.) is preferred. Hot water or steam is circulated in the jacket at temperatures of about 180° to 235° F., (80° to 105° C.) while steam temperatures of about 200° to 250° F. are useful. In this embodiment, the heating fluid is preferably, but not essentially fed counter-current to the fish paste and exited to atmospheric pressure. The flow rate of the fish paste through the heat exchanger is adjusted such that the residence time is sufficient to heat and set the outer layer of the fish paste rope extrudate to a depth of ⅛ to ¼ inch (2 to 7 mm.) preferably, about 4 to 6 mm. while the interior of the core material remains soft and not heat set.

It is important, however, to minimize time spent by the fish paste in the temperature range of about 120° F. to 175° F. (50° to 80° C.). Residual enzymatic activity in the surimi (or especially in added shrimp, if any) can cause undesirable texture softening when the paste is within this temperature range. Once heated to above 80° C., the enzymes are permanently deactivated.

C. Texturization

The rope core with the heat-set sheath portion is then core texturized by the to-be-described operation or "braided" as used herein. In the preferred method of continuous or semicontinuous production, it is convenient to simply extend the pipe or barrel to include a region having an in-line static mixer which serves to texturize the soft core material as it is pumped through the pipe. Any of a variety of conventional helical in-line static mixers can be used herein. The skilled artisan, of course, will appreciate that an in-line static mixer is a device having no moving parts and typically designed for the blending of fluids in-line. The useful helical in-line mixers comprise a series of blades mounted transverse to the pipe which blades contain a 90° twist or quarter spiral. The succeeding blade is mounted such that the meeting downstream blade edge is perpendicular to the previous up-stream blade's tail edge. The effect then is to slice once and to rotate or twist the material flow or rope a quarter turn for each blade. The result of such an operation is that the gel-set sheath or the rope is repeatedly twisted and cut or "braided" which results in a texture, structure, and appearance, resembling the bundled muscle of real shellfish and surrounded with the ungelled matrix of what was the soft ungelled core. Preferred for use herein are static mixers having six blades. Suitable in-line static mixers are available from Chemineer Inc. suoh as the Kenix TM Static Mixer.

Typically, in-line static mixers are designed such that the blades are rigidly mounted in the pipe by selection of suitable gauge piping. However, in the most preferred embodiment of the present invention, the pipe is provided with free floating mixer blades. For a given size mixer blade, such a construction can be obtained by providing a greater gauge or diameter pipe than that which would be employed to fixedly mount the blades. The result is then that the blades are able to freely move up and down but not to rotate such as by having a verticle pin through the barrel and the mixer. Such a construction provides the in-line mixer to be self centering leaving an annular space between the element and the barrel. For example, if a 11/16 inch I.D. tube is employed, then a ⅜ inch diameter in-line mixer would work well.

Provision of a free-floating static mixer blade allows for the skin or exterior set portion of the core to pass through the annular space created by the blades side edge and the inner pipe wall. This provides for the realization of fish ropes having an exterior skin portion of about 1 to 5 mm. which is not textured or aligned and an interior region which is linearly twisted into a fibrous structure.

A further important attribute of the in-line mixer is its length to diameter ("L/D") ratio. Suitable L/D's for use herein range from about 7 to 10 and preferably about 8.5. Reduced L/D ratios can result in insufficient texturing while excessive L/D's can cause uneven flow.

In an even more preferred embodiment, the rope is longitudinally quartered prior to braiding. Such a quartering further aids in the provision of braided texture resembling muscle groups. The quartering can be accomplished by inserting a four blade cutter immediately upstream of the first mixer element. As the skilled artisan will appreciate, the four blade cutter in its simplest form can comprise a pair of radial wires through the pipe set perpendicular to each other. Most preferably, the four blade cutter is aligned with a lead element of the in-line cutter.

D. Firming the Braided Core

Thereafter, the fish rope with the texturized core is firmed with a second heating step to provide greater structural strength to the fish rope for subsequent handling. Conveniently, the pipe is merely extended to include another heat exchange region or zone. The second heating region can conveniently be identical to the first heating region, i.e., a jacketed pipe or barrel. In the preferred embodiment employing a semi-continuous production, since the through-put rate is controlled to provide desired residence times in the first heated region, then in the second heating region the temperature of the heating medium is controlled or the residence time controlled by the length of the heated barrel so as to substantially set the gel through the remainder of the rope core. As noted above, it is desirable to minimize the time the fish rope is held within the temperature range associated with enzymatic softening. Accordingly, the temperature gradients for heating are obtained with a conductive water or steam heat temperature of about 200° to 250° F., (93° to 125° C.). Typical residence times ranging from about 0.25 to 0.5 min. are sufficient to raise the internal temperature to the 140° F.

Therefore, the first heat processing step should be practiced so as to raise the temperature of the entire fish rope to 80° C. as quickly as is possible yet maintain a temperature/time profile such that only the surface of the rope is set and the interior or core of the rope is above 80° C., yet soft.

E. Shaping and Heat Setting

Thereafter, the firmed and braided fish rope is shaped into pieces of predetermined size and shape by any suitable manner. For example, the fish rope can be cut into suitably sized lengths or segments, e.g., 30 to 80 mm., optionally with one angle cut to simulate a shrimp tail, and placed into suitably shaped shrimp (other shell fish shaped molds) forming molds. The pieces are then heat set or coagulated by conventional means such as steam heating in a steam tunnel at 212° to 350° F. for a few minutes or immersing into a hot water bath of 140° to 180° F. (60° C. to 85° C.) for 20-30 minutes gel to the remaining soft fish paste to realize the finished fabricated seafood products of the present invention. Pressure can range from atmospheric to about 40 psig. Of course, should crab leg products be desired in cylindrical shape, the shaping step can be eliminated. If an alginate ingredient has been employed as a texture enhancer ingredient, then the hot water bath desirably contains a calcium ion source and has a pH sufficient to solubilize the calcium ion source, e.g., about 4 to 7 obtained by adding sufficient amounts of any food grade mineral or edible organic acid. Typically then the water bath can contain 2% calcium chloride and/or calcium carbonate and 1% citric acid.

If desired, prior to the pressure molding step, the ropes can be painted with lateral stripes to simulate the surface skin coloration of shrimp or crab legs.

In another more preferred embodiment of the present invention, the shape and setting step technique is continuous. In this technique, the firmed, braided fish rope is formed into a heat set helix. In one manner of practice, the rope is continuously fed to a slowly rotating drum. The rope then forms a helex on the drum and is set into this shape by being fed into the hot water bath at the time and temperature conditions described above. This provides a fish rope which when cut into desired lengths, e.g., 30 to 80 mm., exhibits the desirable curved shape of real shrimp. In another technique, the rope can be fed to a heated core in the form of a helix. (See, for example, U.S. Pat. No. 3,615,686, issued Oct. 26, 1971 to Marshall and which is incorporated herein by reference.)

The fabricated seafood products of the present invention so prepared can be packaged and distributed or otherwise handled in a manner similar to shrimp. Thus, for example, the shrimp may be flash frozen and distributed conventionally. If desired, the fabricated seafood products can be breaded, e.g., with a tempura batter, and oven baked or pan-fried. Also, the fabricated seafood products can be pasteurized to provide refrigerator stable cooked products.

In another embodiment of the present invention the skin feature can be provided in an alternate manner. In this embodiment a fixed static mixer, preferably with prior longitudinal quartering, is used. After the in-line texturization the fish ropes are wrapped with an outer layer to provide a skin feature. The skin feature comprises a flat fiber wrap. The flat fiber wrap is prepared from a fish fiber wrap blend comprising 95% to 98% surimi, 0.1% to 2% salt, 0.1% to 1% sodium alginate, 0.1% to 0.4% tripolyphosphate or other phosphate salt, and optionally 1% to 2% flavor and 0.01% to 0.2% color. The blend is blended in a manner similar to the fish paste as described above with regard to temperature, mixing time and condition of surimi.

In the preparation of braided rope cores for this fiber wrap preparation method, the braided cores are prepared as described above except that the in-line static mixer element is fixed rather than free floating. This results in the entire rope being texturized rather than creation of the skin feature.

Thereafter, the fiber wrap formulation is extruded using a rectangular die opening of, e.g., apx. ⅛ inch by ⅜ inch which produces a flat, rectangular fiber extrudate. As the fiber extrudate leaves the die it is wrapped around the core so that the edges of the fiber wrap meet. In small operations, particularly manual, freezing the braided core assists in applying the skin element. The fiber wrapped, texturized core is then immediately placed in the calcium bath to set the fibers similar to that described above except that it can be at room temperature. The calcium-alginate reaction is well known. The bath formulation typically comprises about 97% water, 1% water soluble calcium salt, e.g., calcium carbonate or calcium chloride, and sufficient edible mineral or organic acid so as to solubilize the calcium source, e.g., a pH of about 4 to 7, typically using about 2% citric acid. After sufficient time to set the wrapped cores, apx. 10 to 20 minutes, the wrapped cores are optionally given a water rinse bath for apx. 30 seconds. The wrapped cores are placed in molds of the appropriate size and shape and heat set to gel the remaining soft fish paste. The resulting fabricated products are characterized as having an exterior wrap or skin of about 1 to 5 mm. thickness in edge to edge configuration surrounding a core of about 2 to 4 mm. in diameter having a braided texture reminiscent of shellfish muscle binders. A variation of this technique is to co-extrude the fiber wrap formulation as a continuous exterior skin or casing around the braided core prior to setting with the calcium bath.

The fabricated seafood products or shrimp analogues of the present invention are characterized by having a "bite" reminiscent to that of similarly sized shrimp or other shellfish. Moreover, the fibrous internal structure is aligned similar to that of real shrimp. Additionally, the fabricated shrimp have both an untextured skin portion and a texturized core or body portion also characteristic of real shrimp. The products so prepared can be used in any other manner to which real shrimp is conventionally used.

The following examples illustrate the various facets of the present invention. It is to be understood, however, that these examples are merely meant to be illustrative and the invention is not to be limited thereto.

EXAMPLE 1

A fish paste was prepared having the following formulation:

| Ingredient | Weight % |
| --- | --- |
| Surimi (top grade, frozen) | 36.00 |
| Surimi (top grade, thawed to 40° F.) | 36.00 |
| Ice | 20.00 |
| Starch[1] | 2.50 |
| Salt[2] | 2.50 |
| Oil[3] | 2.00 |
| Flavors | 1.00 |
| | 100.00% |

[1] A pregellatinized starch supplied by Henkel Corp. under the trade name of Aytex TM.
[2] Having a particle size of about 100 microns.
[3] A partially hydrogenated soybean oil available from Glidden-Durkee, Div. of SCM Corp. as Durkee 100 TM having a Wiley melting point of 65° F.

The ingredients were added to form a 3600 gr. batch in vertical cutter mixer under 10-25 in. Hg. vacuum for about 10 minutes. Thereafter, the mixed fish paste so formed was extruded into a 36 in. jacketed long tube (11/16 I.D.) heated with 235° F. steam to form a fish paste rope.

The ropes were then fed through an in-line cutter and to an in-line cutter (Kenix TM Static Mixer) of ⅝ in. diameter and 5¼ in. long to form braided ropes. The braided ropes were then fed to another 36 in. long jacketed tube heated with 325° F. steam. The heat set ropes so prepared were then cut into 4 in. pieces, placed into shrimp shaped molds, and heat set at 90° C. for 10-15 minutes. The fabricated seafood products of the present invention were characterized as having a shrimp like texture and flavor. The fabricated shrimp had a skin of about 2 mm. in thickness.

EXAMPLE 2

A fabricated seafood product simulating shrimp containing real shrimp meat is prepared having the following formulation:

| Ingredient | Weight % |
| --- | --- |
| Fraction A | |
| Shrimp (deveined, finely chopped) | 10.00 |
| Water | 8.00 |
| Salt | 0.63 |
| Sodium tripolyphosphate | 0.03 |
| Fraction B | |
| Surimi (frozen) | 30.50 |
| Surimi (thawed to 40° F.) | 30.50 |
| Ice | 9.60 |
| Starch | 2.50 |
| Oil (solid) | 2.00 |
| Soy protein[1] | 2.00 |
| Salt | 1.87 |
| Carrageenan | 1.00 |
| Flavor | 1.00 |
| Sodium tripolyphosphate | 0.37 |
| | 100.00% |

[1] A spun soy protein fiber available from Ralston Purina Co. as SPF-200 TM

The raw shrimp is finely chopped and stirred into a large excess of 80° C. water and held for 2 minutes. The shrimp is removed, drained and stirred into an excess of cold water (60° F.) for at least 30 seconds. The shrimp is then drained and frozen.

The frozen shrimp and other ingredients of Fraction A are mixed for 30 seconds in the vertical cutter mixer. Thereafter, the Fraction B ingredients are added and mixed for 10 minutes with a vacuum of 10-25 in. Hg.

Thereafter, the fish paste is extruded and further processed according to the procedure of Example 1. However, the pieces are steamed in a steam tunnel at 245° F. for 20 minutes to prepare a "raw" fabricated shrimp for frozen distribution. Thereafter, surface stripes are hand painted with a solution of water with 1% food color to simulate shrimp skin coloration.

EXAMPLE 3

An alternate method for forming a skin around a braided core is practiced by the method of Example 1, except that an in-line static mixer of 11/16 diameter is employed i.e., equivalent to the inner pipe diameter. So that there is no annular spacing between the pipe and the static mixer. A braided core not having a skin feature is therefore prepared and about 12 in. pieces of rope are formed and are frozen.

Thereafter, a fiber wrap paste is prepared having the following formulation:

| Ingredient | Weight % |
| --- | --- |
| Surimi | 96.55 |
| Flavor | 1.60 |
| Salt | 1.00 |
| Sodium alginate | 0.50 |
| Sodium tripolyphosphate | 0.25 |
| Color | 0.10 |
| | 100.00% |

The surimi comprised a blend of 50:50 frozen to frozen. The fiber wrap paste is mixed with 10–25 in. Hg. vacuum for about 8 minutes.

The paste is fed to a ram type extruder with a die head opening of 1/8"×3/8 and the paste is extruded as a flat rectangular extrudate. The extrudate is wrapped around the frozen core so that the edges of the fiber meet by hand rotation of the core pieces forming fiber wrapped core pieces.

The core pieces are then immediately placed in calcium bath to set the fibers.

The bath formulation is:

| Water | 97% |
|---|---|
| Citric Acid | 2% |
| Calcium Carbonate | 1% |
| | 100% |

After 15 minutes in the bath, the wrapped cores were rinsed in a clean water bath for 30 seconds.

The pieces so formed are texturized and characterized by an exterior skin. The ropes are then cut into 100 mm. segments and placed in shrimp shaped molds. The molds are then heated in a 165° F. water bath for 25 minutes. The fabricated seafood products are then battered, breaded, parfried, and distributed through conventional frozen food channels.

What is claimed is:

1. A method for preparing a fabricated seafood comprising the steps of:
   A. providing a homogeneous fish paste comprising surimi wherein the fish paste is maintained at less than 10° C.,
   B. extruding the fish paste in the form of a cylindrical rope having a diameter of about 10 mm. to 25 mm.,
   C. forming a skin on the rope,
   D. texturizing to provide a rope having a texturized core,
   E. firming the texturized core of the rope with heat,
   F. shaping the rope into pieces of predetermined size and shape; and,
   G. coagulating said pieces into a set gel by heat.

2. The method of claim 1 wherein the fish paste is non-aerated and comprises:
   about 60% to 95% surimi,
   about 0.1% to 5% starch,
   about 0.1% to 4% oil, having a Wiley melting point of less than about 20° C., and
   about 0.1% to 25% water, and
   wherein the oil is added in solid form.

3. The method of claim 2 wherein the water is added in the form of ice and wherein the homogeneous fish paste is prepared by mixing for about 1 to 20 minutes.

4. The method of claim 3 wherein the mixing is performed while pulling a vaccum of about 10 to 30 mm. Hg.

5. The method of claim 4 wherein the paste is mixed for about 1 to 10 minutes.

6. The method of claim 5 wherein the fish paste additionally comprises from about 1% to 3% by weight of salt.

7. The method of claim 6 wherein the core is texturized by in-line cutting with an in-line static mixer having an L/D ratio of about 7 to 10.

8. The method of claim 7 additionally comprising the step, prior to texturizing, of cutting the rope along its long axis into quarters.

9. The method of claim 8 wherein the pieces are coagulated by by immersing in a hot water bath of 60° to 85° C. for about 20 to 30 minutes.

10. The method of claim 9 wherein the skin is formed by heating the rope exterior at 80° to 105° C. for a time sufficient to heat and set the outer layer of the rope to a depth of about 2 to 7 mm.

11. The method of claim 10 wherein the fish paste comprises about 0.05% to 2% glycerol.

12. The method of claim 11 wherein the fish paste additionally comprises about 0.1% to 3% of a texture enhancing agent selected from the group consisting of carrageenan and alginates.

13. The method of claim 9 wherein the skin forming step follows the core texturizing step, said forming step comprising:
   (1) extruding a fiber wrap composition comprising,
      (a) about 95% to 98% by weight of the fiber wrap composition of surimi,
      (b) about 0.1% to 2% by weight salt,
      (c) about 0.1% to 1% sodium alginate, and
      (d) about 0.1% to 0.4% phosphate salt to form a rectangular fiber wrap;
   (2) wrapping the fiber wrap around the rope having said texturized core to form a fiber wrapped rope, and
   (3) immersing said wrapped rope into a water bath at a pH of 4 to 7 and about 0.4% to 2% by weight of the water of a water soluble calcium salt for about 10 to 20 minutes.

14. The method of claim 13 additionally comprising the step of, prior to the skin forming step:
   freezing the rope having a texturized core.

15. The method of claim 10 or 13 wherein the shaping step comprises forming the rope into a helix before coagulating.

16. An edible fabricated seafood product comprising a heat coagulated mixture of fish meat paste, said paste comprising
   about 60% to 95% by weight surimi,
   about 0.1% to 5% by weight starch,
   about 0.1% to 4% by weight oil having a Wiley melting point of below 20° C.,
   about 0.1% to 25% added water, and
wherein said product is in the form of a rope having a braided and texturized core linearly twisted into a fibrous structure and an untexturized skin of about 1 to 7 mm. in thickness.

17. The product of claim 16 wherein the rope is shaped and colored to simulate a shrimp.

18. The product of claim 17 wherein the paste additionally comprises
   about 1% to 20% of fish flesh selected from the group consisting of shrimp, crab, scallops and mixtures thereof.

19. The product of claim 18 wherein the paste additionally comprises
   about 0.05% to 2% glycerol,
   about 1% to 3% fine flour salt, and
   about 0.1% to 3% of a texture enhancing agent.

20. The product of claim 19 wherein the skin is formed of a wrap about the exterior of the core, said wrap comprising
   about 95% to 98% by weight of the wrap of surimi,
   about 0.1% to 2% by weight of salt,
   about 0.1% sodium alginate,
   about 0.1% to 0.4% by weight phosphate salt, said wrap having been set in a water bath at a pH of 4 to 7 for 10 to 20 minutes and containing about 0.5% to 2% by weight of the bath of a water soluble calcium salt.

21. The product of claim 19 additionally comprising a breaded coating.

22. The product of claim 20 wherein the paste comprises
   about 80% to 95% by weight surimi,
   about 1% to 3% starch,
   about 1% to 3% oil,
   about 10% to 20% added water.

* * * * *